United States Patent
Kato (10) Patent No.: US 9,604,626 B2
(45) Date of Patent: Mar. 28, 2017

(54) HYBRID VEHICLE

(71) Applicant: Toyota Jidosha Kabushiki Kaisha, Toyota-shi Aichi-ken (JP)

(72) Inventor: Shunya Kato, Seto Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/628,551

(22) Filed: Feb. 23, 2015

(65) Prior Publication Data

US 2015/0266465 A1 Sep. 24, 2015

(30) Foreign Application Priority Data

Mar. 24, 2014 (JP) ................ 2014-059960

(51) Int. Cl.
| | |
|---|---|
| *B60W 10/26* | (2006.01) |
| *B60L 11/18* | (2006.01) |
| *B60W 10/11* | (2012.01) |
| *B60K 6/445* | (2007.10) |

(52) U.S. Cl.
CPC ............ *B60W 10/26* (2013.01); *B60K 6/445* (2013.01); *B60L 11/1809* (2013.01); *B60L 11/1851* (2013.01); *B60W 10/11* (2013.01); *B60W 2510/06* (2013.01); *B60W 2510/10* (2013.01); *B60W 2710/244* (2013.01); *Y02T 10/6239* (2013.01); *Y10S 903/93* (2013.01)

(58) Field of Classification Search
CPC .. B60W 10/11; B60W 10/26; B60W 2510/06; B60W 2510/10; B60L 11/1809; B60L 11/1815; Y10S 903/93

USPC .......................................................... 701/22
See application file for complete search history.

(56) References Cited

U.S. PATENT DOCUMENTS

| 8,700,242 B2* | 4/2014 | Kanamori ................ B60K 6/48 180/65.265 |
| 9,045,136 B2* | 6/2015 | Frank .................... B60W 20/20 |
| 2005/0044873 A1* | 3/2005 | Tamai .................... B60H 1/004 62/323.1 |
| 2009/0084618 A1* | 4/2009 | Thompson ............. B60K 6/445 180/65.8 |
| 2010/0065357 A1* | 3/2010 | Oyama .................. B60K 6/365 180/65.265 |
| 2013/0190132 A1 | 7/2013 | Izawa |
| 2014/0236441 A1* | 8/2014 | Sato .................. B60W 20/1082 701/64 |

(Continued)

FOREIGN PATENT DOCUMENTS

| CN | 103097219 A | 5/2013 |
| JP | 2004-211575 A | 7/2004 |

(Continued)

*Primary Examiner* — McDieunel Marc
*Assistant Examiner* — James E Stroud
(74) *Attorney, Agent, or Firm* — Dinsmore & Shohl LLP (57) ABSTRACT

An ECU performs a control process including the steps of: acquiring information about a gear, a vehicle speed, a depression amount of an accelerator pedal, and a transmission mode being selected; calculating a reference value; calculating a restriction value; calculating a target value of the SOC; calculating a required electric power value; and outputting a command value for the engine torque and respective torque command values for a first MG and a second MG.

5 Claims, 5 Drawing Sheets (56) References Cited

U.S. PATENT DOCUMENTS

2014/0335995 A1* 11/2014 Swales .................. B60W 20/00
                                                     477/3
2014/0366670 A1* 12/2014 Tanaka ................... B60K 6/445
                                                     74/473.12

FOREIGN PATENT DOCUMENTS

| JP | 2011-121413 A | 6/2011 |
| JP | 2013-035336 A | 2/2013 |
| JP | 2013-063736 A | 4/2013 |

* cited by examiner

HYBRID VEHICLE

This nonprovisional application is based on Japanese Patent Application No. 2014-059960 filed on Mar. 24, 2014 with the Japan Patent Office, the entire contents of which are hereby incorporated by reference.

BACKGROUND OF THE INVENTION

Field of the Invention

The present invention relates to control of the state of charge of a power storage device mounted on a hybrid vehicle.

Description of the Background Art

A hybrid vehicle including an electric motor capable of transmitting motive power to wheels and a power storage device supplying electric power to the electric motor has been known. Regarding such a hybrid vehicle, Japanese Patent Laying-Open No. 2013-035336 for example discloses a technique of determining a target value of the state of charge of the power storage device based on the vehicle speed.

In the case where a target value of the state of charge of the power storage device is determined based on the vehicle speed, however, a large change of the vehicle speed may be accompanied by a large change of the target value of the state of charge. A large change of the target value of the state of charge is then accompanied by a large change of the output which is required of the engine and the electric motor. Due to this, torque shock, noise, and the like may occur to the vehicle to thereby deteriorate the drivability.

SUMMARY OF THE INVENTION

An object of the present invention is to provide a hybrid vehicle appropriately changing the target value of the state of charge of the power storage device to thereby suppress occurrence of torque shock, noise, and the like.

A hybrid vehicle according to an aspect of the present invention includes: an electric motor configured to transmit motive power to a wheel; a power storage device configured to supply and receive electric power to and from the electric motor; an engine used for charging the power storage device; and a control device configured to determine a target value based on a condition of the vehicle and control a state of charge of the power storage device so that the state of charge reaches the target value. The control device restricts an amount of change of the target value when a magnitude of a drive force required by a driver is relatively small, with respect to the amount of change of the target value when the magnitude of the drive force required by the driver is relatively large.

Accordingly, when the magnitude of the drive force required by the driver is relatively small, the amount of change of the target value is restricted with respect to the amount of change thereof when the magnitude of the drive force required by the driver is relatively large. Thus, when the magnitude of the drive force required by the driver is relatively small, for example, the target value of the state of charge changes gently. Therefore, the output which is required of the engine and the electric motor changes gently. Consequently, occurrence of shock, noise, and the like (hereinafter referred to as shock and the like) to the vehicle can be suppressed. In contrast, when the magnitude of the drive force required by the driver is relatively large, shock and the like occurring to the vehicle due to a change of the target value disappears in shock and the like occurring to the vehicle due to another cause (due to a large magnitude of the drive force), and therefore, a greater change of the target value is accepted relative to that when the required drive force is relatively small. In this way, the state of charge of the power storage device can be controlled appropriately in accordance with the target value, and the fuel economy can thus be improved. Accordingly, the hybrid vehicle appropriately changing the target value of the state of charge of the power storage device to thereby suppress occurrence of torque shock, noise, and the like can be provided.

Preferably, the vehicle further includes an automatic transmission having an automatic transmission mode and a manual transmission mode. The control device restricts the amount of change when the automatic transmission mode is being selected, with respect to the amount of change when the manual transmission mode is being selected.

Accordingly, when the automatic transmission mode is being selected, the amount of change of the target value is restricted with respect to the amount of change thereof when the manual transmission mode is being selected. The manual transmission mode is more frequently selected when the driver requires a large drive force. Therefore, while the manual transmission mode is selected, shock and the like due to a change of the target value disappears in shock and the like due to another cause (due to a large magnitude of the drive force), and therefore, a greater change of the target value is accepted relative to that when the automatic transmission mode is being selected. In this way, the state of charge of the power storage device can be controlled appropriately in accordance with the target value, and the fuel economy can thus be improved.

More preferably, the vehicle further includes a detection device configured to detect a depression amount of an accelerator pedal. The control device restricts the amount of change when the depression amount is relatively small, with respect to the amount of change when the depression amount is relatively large.

Accordingly, when the depression amount is relatively small, the amount of change of the target value is restricted, with respect to the amount of change thereof when the depression amount is relatively large. Therefore, when the depression amount of the accelerator pedal is small, the target value changes gently. Occurrence of shock and the like to the vehicle can thus be suppressed. In contrast, when the depression amount of the accelerator pedal is relatively large, shock and the like due to a change of the target value disappears in shock and the like occurring due to another cause (the large depression amount of the accelerator pedal), and therefore, a greater change of the target value is accepted relative to that when the depression amount of the accelerator pedal is relatively small. In this way, the state of charge of the power storage device can be controlled appropriately in accordance with the target value, and the fuel economy can thus be improved.

Still more preferably, the vehicle further includes a geared transmission. The control device determines the target value based on a gear of the geared transmission.

Accordingly, the target value of the state of charge is determined based on the gear of the geared transmission. The target value appropriate for the gear is determined, and thus the target value appropriate for the vehicle speed and the drive force required by the driver can be determined.

Further preferably, the geared transmission starts upshifting from a first gear to a second gear when a travel condition of the vehicle makes a transition from a region outside an upshift region into the upshift region, and starts downshifting from the second gear to the first gear when the travel condition makes a transition from a region outside a downshift region into the downshift region. When the travel condition is in a region between the upshift region and the downshift region, the control device sets the target value of the state of charge to a value between a first target value of the state of charge corresponding to the first gear and a second target value of the state of charge corresponding to the second gear.

Accordingly, when the travel condition is in a region between the upshift region and the downshift region, the target value of the state of charge is set to a value between the first target value and the second target value. Thus, before shifting to the first gear or before shifting to the second gear, the target value of the power storage device can be made closer to the target value corresponding to the gear which is engaged after gear shifting. Therefore, a large change of the target value which may occur when downshifting or upshifting is thereafter started can be suppressed.

The foregoing and other objects, features, aspects and advantages of the present invention will become more apparent from the following detailed description of the present invention when taken in conjunction with the accompanying drawings.

DESCRIPTION OF THE PREFERRED
EMBODIMENTS

An embodiment of the present invention will hereinafter be described with reference to the drawings. In the following description, the same parts are denoted by the same reference characters. They are also named identically and function identically. A detailed description thereof will therefore not be repeated.

Figure 1:
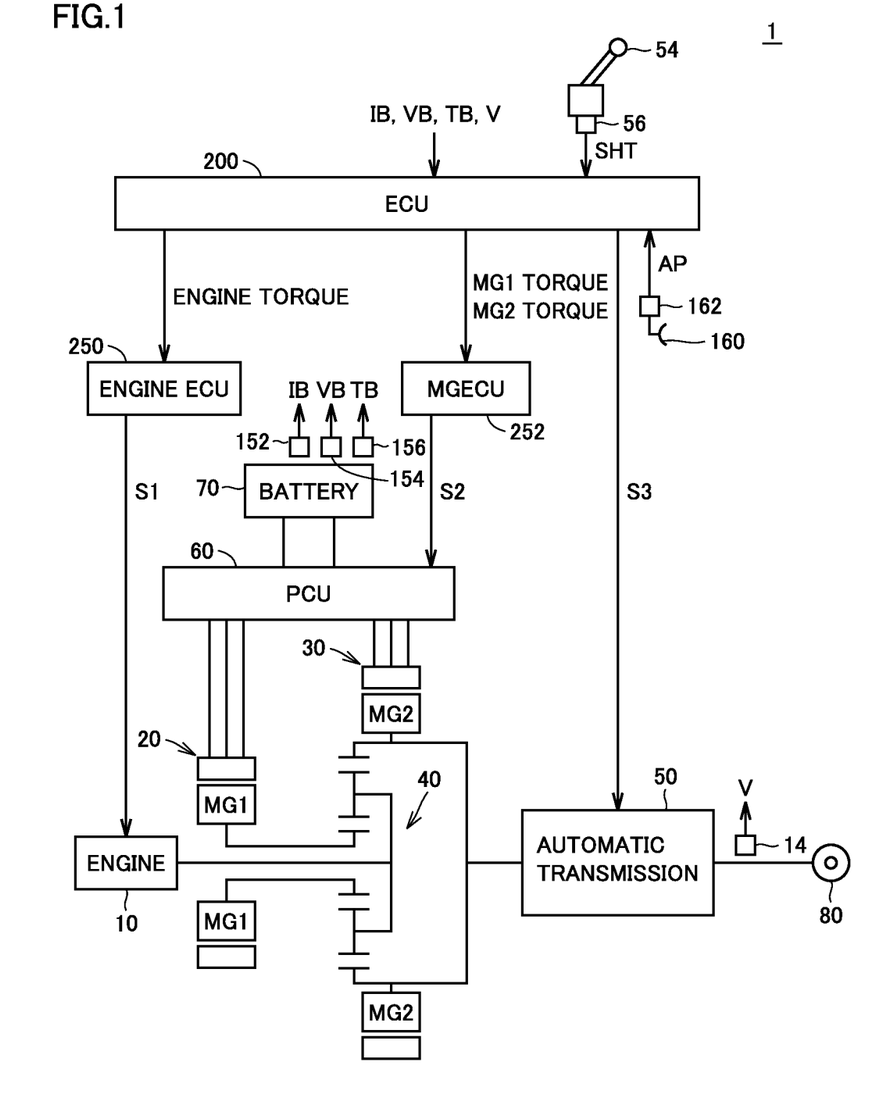
FIG. 1 is a diagram showing a configuration of a hybrid vehicle.

FIG. 1 is a diagram showing a configuration of a hybrid vehicle 1 (hereinafter simply referred to as vehicle 1). As shown in FIG. 1, vehicle 1 includes an engine 10, a first motor generator (hereinafter referred to as first MG) 20, a second motor generator (hereinafter referred to as second MG) 30, a power split device 40, an automatic transmission 50, a PCU (Power Control Unit) 60, a battery 70, a drive wheel 80, an ECU (Electronic Control Unit) 200, an engine ECU 250, and an MG ECU 252.

Vehicle 1 is caused to travel by a drive force which is output from at least one of engine 10 and second MG 30. Motive power generated by engine 10 is split by power split device 40 into two paths. One of the two paths is a path through which the motive power is transmitted through automatic transmission 50 to drive wheel 80, and the other thereof is a path through which the motive power is transmitted to first MG 20.

Engine 10 is an internal combustion engine in which an air-fuel mixture injected from an injector is burned in a combustion chamber of a cylinder to rotate an output shaft. Engine 10 is controlled based on a control signal S1 from engine ECU 250.

First MG 20 and second MG 30 are each a three-phase AC rotating electric machine, for example. First MG 20 and second MG 30 are driven by PCU 60.

First MG 20 has a function of a generator (power generator) using motive power of engine 10 to generate electric power and thereby charge battery 70. First MG 20 also has a function of a starter rotating a crankshaft of engine 10 to thereby start engine 10.

Second MG 30 has a function of a drive motor applying a drive force through automatic transmission 50 to drive wheel 80. Second MG 30 also has a function of a generator generating electric power through regenerative braking to thereby charge battery 70.

Power split device 40 is a planetary gear train having three rotational shafts of a sun gear, a planetary gear, and a ring gear, respectively. For example, a rotor of first MG 20 is connected to the sun gear, the output shaft of engine 10 is connected to the carrier, and the rotational shaft of second MG 30 (input shaft of automatic transmission 50) is connected to the ring gear. Accordingly, engine 10, first MG 20, and second MG 30 are mechanically connected to power split device 40.

Automatic transmission 50 has a plurality of gears (first gear to fourth gear for example). Automatic transmission 50 automatically shifts gears among first to fourth gears depending on the condition of vehicle 1. Automatic transmission 50 is controlled based on a control signal S3 from ECU 200. Among the first to fourth gears, the first gear is a lower-speed gear (gear of a higher gear ratio) and the fourth gear is a higher-speed gear (gear of a lower gear ratio).

A shift lever 54 is an operation member for a driver to select one of a plurality of shift positions (forward travel position for example), make a switch between the manual transmission mode and the automatic transmission mode, or shift gears while the manual transmission mode is selected.

PCU 60 converts DC power from battery 70 into AC power to thereby drive first MG 20 or second MG 30. PCU 60 also converts AC power generated by first MG 20 and second MG 30 into DC power to thereby charge battery 70. PCU 60 is configured for example to include an inverter and a converter. PCU 60 is controlled based on a control signal S2 from MG ECU 252.

Battery 70 is a power storage device which is a rechargeable DC power supply. As battery 70, a secondary battery such as nickel-metal hydride battery or lithium-ion battery for example is used. Battery 70 may be charged with electric power generated by first MG 20 and/or second MG 30 as described above, and may also be charged with electric power supplied from an external power supply (not shown). Battery 70 is not limited to the secondary battery, but may be a device capable of generating a DC voltage, such as capacitor, solar cell, fuel cell, or the like, for example.

To ECU 200, a vehicle speed sensor 14, a shift position sensor 56, a current sensor 152, a voltage sensor 154, a battery temperature sensor 156, and a pedal position sensor 162 are connected.

Vehicle speed sensor 14 is mounted on an output shaft of automatic transmission 50 for detecting vehicle speed V. Shift position sensor 56 detects position SHT of shift lever 54. Current sensor 152 detects current IB of battery 70. Voltage sensor 154 detects voltage VB of battery 70. Battery temperature sensor 156 detects battery temperature TB of battery 70. Pedal position sensor 162 detects depression amount AP of an accelerator pedal 160. These sensors transmit respective signals representing the results of detection to ECU 200.

ECU 200 estimates the state of charge (hereinafter referred to as SOC) of battery 70 based on current IB, voltage VB, and battery temperature TB. ECU 200 may also estimate an OCV (Open Circuit Voltage) based on current IB, voltage VB, and battery temperature TB, for example, and then estimate the SOC of battery 70 based on the estimated OCV and a predetermined map. Alternatively, ECU 200 may estimate the SOC of battery 70 by calculating the product of charging current and discharging current of battery 70, for example.

ECU 200 controls an output torque of engine 10 (hereinafter referred to as engine torque) by means of engine ECU 250 so that the travel condition of vehicle 1 reaches a desired condition, based on respective results of detection by the sensors, and also controls respective output torques of first MG 20 and second MG (hereinafter referred to as first MG torque and second MG torque) by means of MG ECU 252. ECU 200, engine ECU 250, and MG ECU 252 may be integrated into a single ECU.

In vehicle 1 having the components as described above, ECU 200 determines a target value of the SOC of battery 70 based on a condition of vehicle 1, and controls the first MG torque, the second MG torque, and the engine torque so that the SOC reaches the determined target value.

If this target value is determined based for example on vehicle speed V, a large change of vehicle speed V may be accompanied by a large change of the target value. The large change of the target value of the SOC is then accompanied by a large change of the output which is required of engine 10, first MG 20, and second MG 30, and therefore, shock and the like may occur to the vehicle to thereby deteriorate the drivability.

In view of this, the present embodiment is characterized by that ECU 200 restricts the amount of change of the target value of the SOC of the battery 70 when the magnitude of a drive force required by a driver is relatively small, with respect to the amount of change thereof when the magnitude of the required drive force is relatively large. Accordingly, when the magnitude of the required drive force is small, the change of the target value of the state of charge is gentler, which makes gentler the change of the required output of the engine and the electric motor. Consequently, occurrence of shock and the like to the vehicle can be suppressed.

Specifically, when the automatic transmission mode is being selected, ECU 200 restricts the amount of change of the target value with respect to the amount of change thereof when the manual transmission mode is being selected. Further, when depression amount AP of accelerator pedal 160 is relatively small, ECU 200 restricts the amount of change of the target value with respect to the amount of change thereof when depression amount AP is relatively large.

Figure 2:
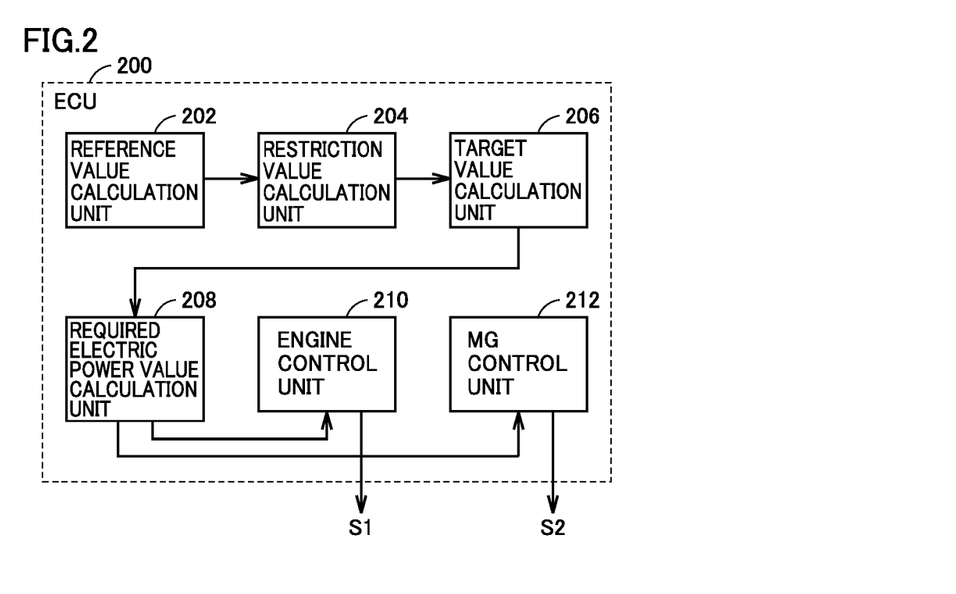
FIG. 2 is a functional block diagram of an ECU.

FIG. 2 shows a functional block diagram of ECU 200 mounted on vehicle 1 in the present embodiment. ECU 200 includes a reference value calculation unit 202, a restriction value calculation unit 204, a target value calculation unit 206, a required electric power value calculation unit 208, an engine control unit 210, and an MG control unit 212. These components may be implemented by software such as program or may be implemented by hardware.

Reference value calculation unit 202 calculates a reference value of the SOC of battery 70 based on the condition of vehicle 1. Reference value calculation unit 202 identifies a position on a gear-shift diagram of FIG. 3, from vehicle speed V and the output torque of vehicle 1.

Figure 3:
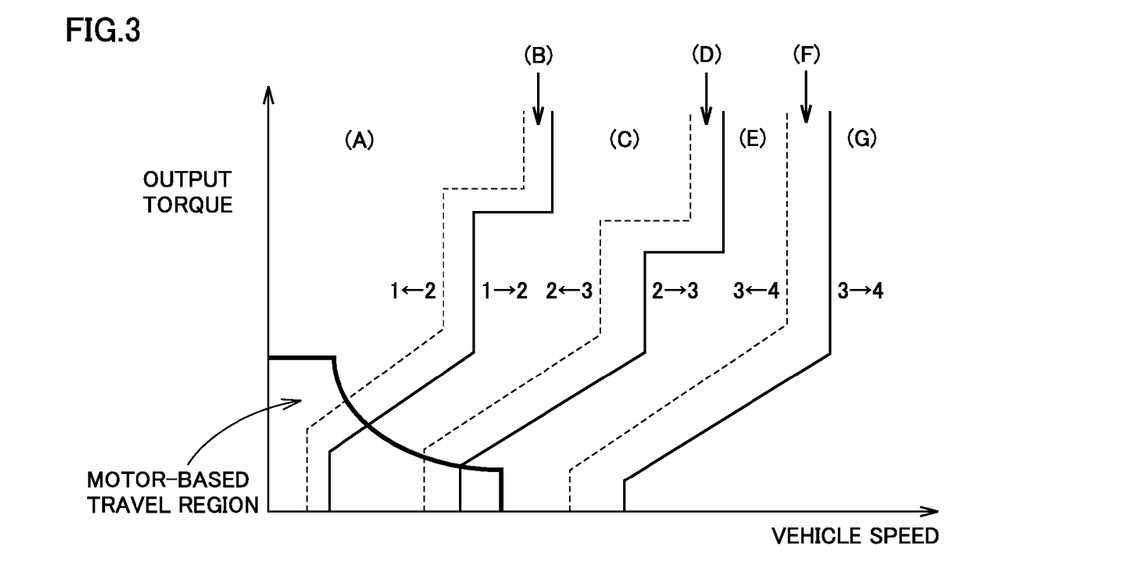
FIG. 3 is a gear-shift diagram showing a plurality of gear-shift lines corresponding to a first gear to a fourth gear.

The horizontal axis of FIG. 3 represents vehicle speed V. The vertical axis of FIG. 3 represents the output torque of vehicle 1. The gear-shift diagram of FIG. 3 includes a plurality of upshift lines (thin solid lines) and a plurality of downshift lines (broken lines). The plurality of gear-shift lines are each defined so that the gear-shift line does not cross other gear-shift lines. Each of the plurality of gear-shift lines is defined so that the vehicle speed at which gearshift is started is lower as the output torque is smaller. Further, the plurality of upshift lines are defined so that an upshift line with a larger post-upshift gear has a higher vehicle speed at which upshift is started, on the condition that the output torque is the same. The plurality of downshift lines are defined so that a downshift line with a smaller post-downshift gear has a lower vehicle speed at which downshift is started, on the condition that the output torque is the same. In FIG. 3, the region enclosed by the bold line, the vertical axis, and the horizontal axis is a motor-based travel region. In the motor-based travel region, the second MG torque is transmitted from second MG 30 to automatic transmission 50 while vehicle 1 is traveling. Regarding the motor-based travel region, the same gear shift line (gear shift line in the motor-based travel region in FIG. 3 for example) may be used for both the case where vehicle 1 travels in an EV (Electric Vehicle) mode using only second MG 30 as a drive source and the case where vehicle 1 travels in an HV (Hybrid Vehicle) mode using engine 10 and second MG 30 as drive sources, or different gear-shift lines may be used respectively for the case where vehicle 1 travels in the EV mode and vehicle 1 travels in the HV mode in the motor-based travel region in FIG. 3.

Reference value calculation unit 202 identifies one of regions (A) to (G) on the gear-shift diagram of FIG. 3 that includes the position which is identified from vehicle speed V and the output torque of vehicle 1.

In the gear-shift diagram of FIG. 3, region (A) is a region located leftward with respect to the second-to-first downshift line where the first gear is engaged. Region (B) is a region located between the second-to-first downshift line and the first-to-second upshift line where one of the first gear and the second gear is engaged.

Region (C) is a region located between the first-to-second upshift line and the third-to-second downshift line where the second gear is engaged. Region (D) is a region located between the third-to-second downshift line and the second-to-third upshift line where one of the second gear and the third gear is engaged.

Region (E) is a region located between the second-to-third upshift line and the fourth-to-third downshift line where the third gear is engaged. Region (F) is a region located between the fourth-to-third downshift line and the third-to-fourth upshift line where one of the third gear and the fourth gear is engaged.

Region (G) is a region located rightward with respect to the third-to-fourth upshift line where the fourth gear is engaged.

Reference value calculation unit 202 calculates the output torque by calculating a required drive torque based on depression amount AP of accelerator pedal 160. Reference value calculation unit 202 may also calculate the output torque taking into consideration vehicle speed V for example in addition to depression amount AP. Reference value calculation unit 202 may calculate the output torque using a predetermined map showing a relationship between depression amount AP and the required drive torque, for example.

Figure 4:
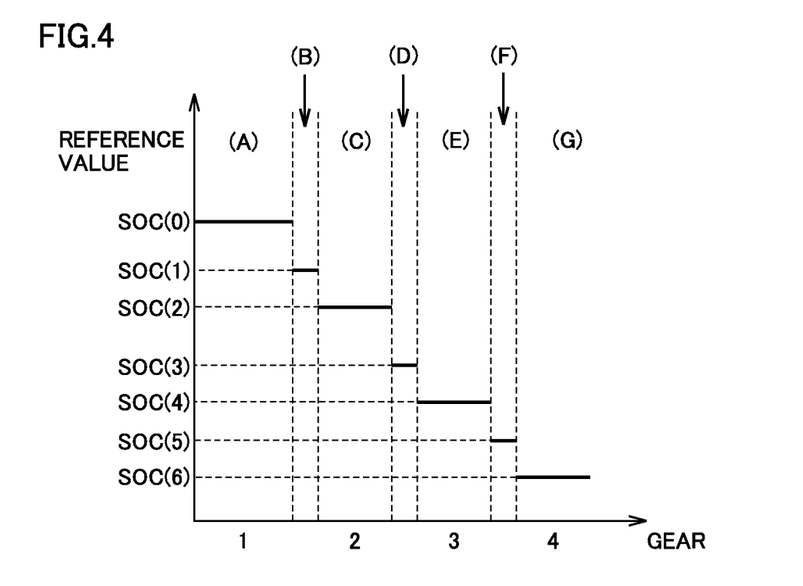
FIG. 4 is a diagram showing a relationship between gears and reference values.

Reference value calculation unit 202 uses FIG. 4 to calculate a reference value associated with the identified region. The horizontal axis of FIG. 4 represents the gear. The vertical axis of FIG. 4 represents the reference value.

As shown in FIG. 4, reference values SOC (0) to SOC (6) are associated with region (A) to region (G), respectively. Reference value SOC (0) associated with region (A) among regions (A) to (G) is the largest value and reference value SOC (6) associated with region (G) is the smallest value. Reference values SOC (1) to SOC (5) are set so that the reference value is larger as the region with which the reference value is associated is closer to region (A), and the reference value is smaller as the region with which the reference value is associated is closer to region (G).

Thus, reference value SOC (1) associated with region (B) is a value between reference value SOC (0) associated with region (A) and reference value SOC (2) associated with region (C). Reference value SOC (3) associated with region (D) is a value between reference value SOC (2) associated with region (C) and reference value SOC (4) associated with region (E). Reference value SOC (5) associated with region (F) is a value between reference value SOC (4) associated with region (E) and reference value SOC (6) associated with region (G).

Reference value calculation unit 202 uses FIG. 4 to calculate a reference value associated with the identified region among regions (A) to (G).

Restriction value calculation unit 204 calculates a restriction value for the amount of change of the target value of the SOC of battery 70, based on a load (travel power) of vehicle 1. Specifically, based on vehicle speed V and a required drive torque, restriction value calculation unit 204 calculates the load of vehicle 1. Restriction value calculation unit 204 uses the calculated value of the load and a predetermined map as shown in FIG. 5 to calculate the restriction value.

Figure 5:
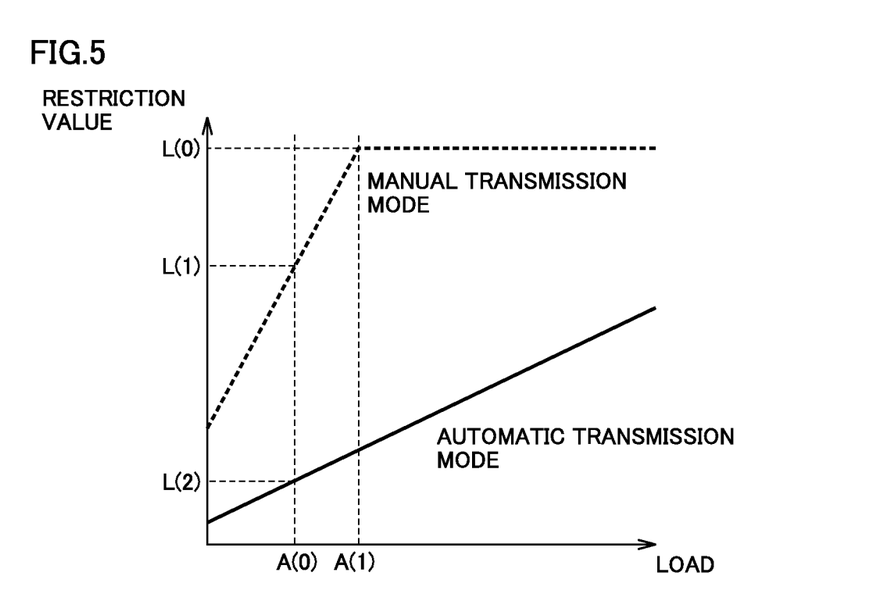
FIG. 5 is a diagram showing a relationship between a load and a restriction value of an amount of change.

The horizontal axis of FIG. 5 represents the load of vehicle 1. The vertical axis of FIG. 5 represents the restriction value. The solid line in FIG. 5 represents a relationship between the load and the restriction value while the automatic transmission mode is selected. As shown by the solid line in FIG. 5, the relationship between the load and the restriction value while the automatic transmission mode is selected is a linear relationship where the restriction value increases (harder to restrict) as the load increases. This relationship is not limited to the linear relationship but may be a non-linear relationship.

The broken line in FIG. 5 represents the relationship between the load and the restriction value while the manual transmission mode is selected. As shown by the broken line in FIG. 5, the relationship between the load and the restriction value while the manual transmission mode is selected is a linear relationship where the restriction value increases as the load increases until the load reaches a predetermined value A (1). This relationship is not limited as well to the linear relationship.

The relationship between the load and the restriction value while the manual transmission mode is selected is a relationship where the restriction value is a predetermined value L (0) regardless of the magnitude of the load in the case where the load is larger than predetermined value A (1).

Thus, in the case where the load is A (0) for example, restriction value L (1) calculated while the manual transmission mode is selected (broken line in FIG. 5) is larger than restriction value L (2) calculated while the automatic transmission mode is selected (solid line in FIG. 5).

Target value calculation unit 206 calculates the target value of the SOC, based on the calculated reference value and restriction value. Specifically, target value calculation unit 206 calculates a difference between the current target value (target value calculated last) and the reference value.

Target value calculation unit 206 determines that the reference value is a new target value (latest target value), in the case where the magnitude of the calculated difference is smaller than the restriction value.

In the case where the magnitude of the calculated difference is larger than the restriction value, target value calculation unit 206 restricts the amount of change with respect to the current target value, using the restriction value. Namely, in the case where the current target value is smaller than the reference value, target value calculation unit 206 adds the restriction value to the current target value and determines that the resultant value is the new target value. In the case where the current target value is larger than the reference value, target value calculation unit 206 subtracts the restriction value from the current target value and determines that the resultant value is the new target value.

Based on the calculated target value and the current SOC, required electric power value calculation unit 208 calculates the required electric power value. Specifically, required electric power value calculation unit 208 may calculate the required electric power value through feedback control (PI control for example) based on the calculated target value and the current SOC, or calculate the required electric power value based on the difference between the calculated target value and current SOC and a predetermined map defining a relationship between the difference and the required electric power value.

Engine control unit 210 adds a correction value corresponding to the required electric power value to a command value for the engine torque of engine 10 based on the required drive torque, to thereby correct the command value, and transmits the corrected command value to engine ECU 250. Based on the received command value, engine ECU 250 performs fuel injection control, throttle valve control, and ignition control for engine 10.

MG control unit 212 calculates the first MG torque and the second MG torque in accordance with the required electric power value, and transmits to MG ECU 252 the torque command value corresponding to the calculated first MG torque and the torque command value corresponding to the second MG torque. Based on the received torque command values, MG ECU 252 controls the first MG torque and the second MG torque through PCU 60.

Figure 6:
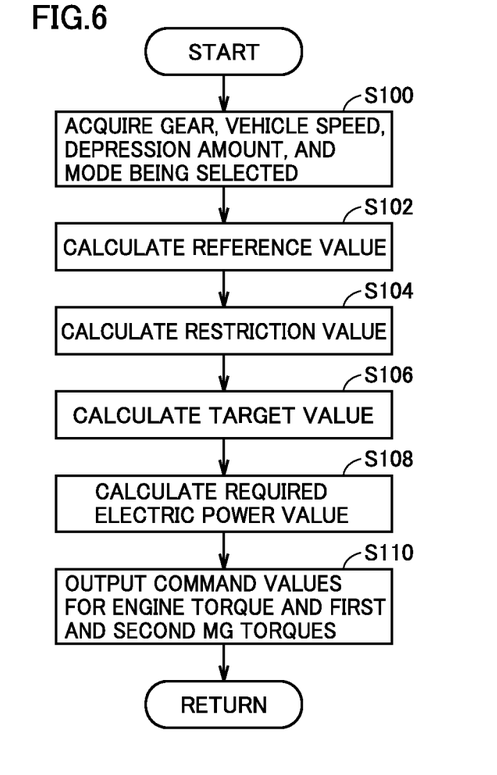
FIG. 6 is a flowchart showing a control process performed by the ECU.

Referring to FIG. 6, a description will be given of a control process performed by ECU 200 mounted on vehicle 1 in the present embodiment.

In step (hereinafter step is abbreviated as S) 100, ECU 200 acquires information about the current gear, vehicle speed V, depression amount AP of accelerator pedal 160, and the transmission mode being selected, from, for example, a memory incorporated in ECU 200 or various sensors or the like.

In S102, ECU 200 calculates a reference value. In S104, ECU 200 calculates a restriction value. The ways to calculate the reference value and the restriction value are those described above, and therefore, the detailed description thereof will not be repeated.

In S106, ECU 200 calculates a new target value based on the calculated reference value and restriction value and the current target value. In S108, ECU 200 calculates a required electric power value based on the difference between the calculated target value and the current SOC.

In S110, ECU 200 corrects a command value for the engine torque in consideration of the calculated required electric power value to transmit the corrected command value to engine ECU 250, and also transmits to MG ECU 252 a torque command value for the first MG torque and a torque command value for the second MG torque, based on the calculated required electric power value.

Figure 7:
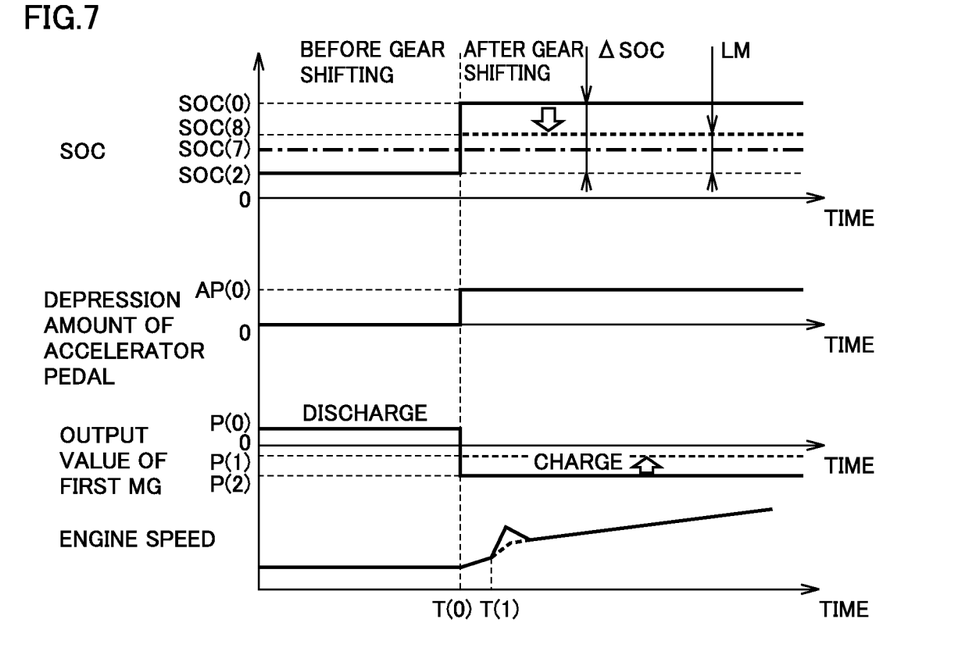
FIG. 7 is a timing chart showing an operation of the ECU.

Referring to FIG. 7, a description will then be given of an operation of ECU 200 mounted on vehicle 1 in the present embodiment, based on the above-described configuration and flowchart.

As shown in FIG. 7, it is supposed that the current SOC is SOC (7) (the dot-and-dash line in the uppermost section of the chart in FIG. 7), the second gear is engaged, and the target value is reference value SOC (2) associated with region (C). It is also supposed that depression amount AP of accelerator pedal 160 is almost zero. It is further supposed that the automatic transmission mode is being selected. For the sake of convenience of the following description, it is supposed the current SOC remains the same before and after gear shifting.

Because the current SOC is higher than target value SOC (2), the required electric power value is a value for discharging. In addition, because depression amount AP is almost zero, second MG 30 performs neither regenerative operation nor power-running operation. Meanwhile, speed reduction of vehicle 1 in response to a depression amount AP of almost zero is accomplished by means of the first MG torque or friction loss of engine 10. It is supposed that at this time the output value of the first MG torque is value P (0) for discharging because of the travel condition of vehicle 1. It is supposed that at this time engine 10 has a constant rotational speed.

At time T (0), a driver increases depression amount AP of accelerator pedal 160 from the amount of almost zero to AP (0), so that the position on the gear-shift diagram in FIG. 3 which is determined based on the travel condition of vehicle 1 changes from region (C) to region (A). Then, the second gear is downshifted to the first gear.

At this time, information about the current gear, vehicle speed V, depression amount AP of accelerator pedal 160, and the transmission mode being selected is acquired from the memory incorporated in ECU 200 or various sensors (S100).

Then, reference value SOC (0) associated with region (A) is calculated (S102). From a load which is calculated from vehicle speed V and a required drive torque, and the map shown by the solid line in FIG. 5, restriction value LM is calculated (S104).

As shown by the solid line in the uppermost section of the chart in FIG. 7, in the case where difference ΔSOC between target value SOC (2) before gear shifting and reference value SOC (0) after gear shifting is larger than restriction value LM, a new target value is a value SOC (8) (thick broken line in the uppermost section of the chart in FIG. 7) which is calculated by adding the calculated restriction value LM to target value SOC (2) before gear shifting.

Because target value SOC (8) is higher than the current SOC, the calculated required electric power value is a value for charging. Therefore, the output value of first MG 20 is value P (1) for charging. Further, because the target value is restricted to target value SOC (8), the difference between the current SOC and target value SOC (8) is smaller than the difference between the current SOC and reference value SOC (0). Thus, the magnitude (absolute value) of output value P (1) of first MG 20 is a value smaller than the magnitude of output value P (2) in the case where reference value SOC (0) is the target value.

Therefore, when a comparison is made between the case where the target value is reference value SOC (0) and the case where the target value is restricted to SOC (8), the amount of charging of battery 70, at and after time T (1), is larger in the case where reference value SOC (0) is the target value. Accordingly, as shown by the solid line in the lowermost section of the chart in FIG. 7, the rotational speed of engine 10 temporarily changes to a greater extent than the rotational speed of engine 10 in the case where the target value is restricted to SOC (8) (the broken line in the lowermost section of the chart in FIG. 7). Namely, the increase of the rotational speed of engine 10 is gentler in the case where the target value is restricted to SOC (8) than the case where reference value SOC (0) is the target value.

In this way, vehicle 1 in the present embodiment restricts the amount of change of the target value of the SOC when the load (namely the magnitude of the drive force required by the driver) which is calculated based on depression amount AP of accelerator pedal 160 is relatively small, with respect to the amount of change thereof when the load is relatively large. Accordingly, when the load is small for example, the change of the target value of the SOC is gentler. Thus, the change of the output required of engine 10 and electric motors, namely first MG 20 and second MG 30 is gentler. Consequently, occurrence of shock and the like to vehicle 1 can be suppressed. In contrast, when the load is relatively large, shock and the like occurring to vehicle 1 due to a change of the target value of the SOC disappears in shock and the like due to another cause, namely the large load. Therefore, a relatively larger change of the target value of the SOC is accepted as compared with the case where the load is relatively small. Accordingly, the SOC of battery 70 can be controlled appropriately in accordance with the target value to thereby improve fuel economy. There can thus be provided the hybrid vehicle appropriately changing the target value of the state of charge of the power storage device to thereby suppress occurrence of torque shock, noise, and the like.

Further, when the automatic transmission mode is being selected, the amount of change of the target value of the SOC is restricted with respect to the amount of change thereof when the manual transmission mode is being selected. The manual transmission mode is more frequently selected when the driver requires a large drive force. Therefore, while the manual transmission mode is selected, shock and the like due to a change of the target value disappears in shock and the like due to another cause, and therefore, a greater change of the target value is accepted relative to that while the automatic transmission mode is selected. In this way, the SOC of battery 70 can be controlled appropriately in accordance with the target value, and therefore, the fuel economy can be improved.

Further, the target value of the SOC is determined based on each of a plurality of gears, and therefore, the target value based on both the vehicle speed and the magnitude of the drive force required by the driver can be determined.

Further, in the case where the position on the gear-shift diagram of FIG. 3 that is identified based on the travel condition of vehicle 1 is for example in region (B) between region (A) where the first gear is engaged and region (C) where the second gear is engaged, value SOC (1) between reference value SOC (0) associated with region (A) and reference value SOC (2) associated with region (C) is determined for use as the reference value of the SOC. Accordingly, before downshifting to the first gear or before upshifting to the second gear, the target value of the SOC can be made closer to the target value corresponding to the gear which is engaged after gear shifting. Then, in the case where upshifting to the second gear or downshifting to the first gear is subsequently started, a large change of the target value can be suppressed.

Modifications will now be described. The embodiment has been described in which the target value restricted after gear shifting remains the same until the next gear shifting. Instead, the target value restricted after gear shifting may be changed by a predetermined amount of change after a predetermined time has elapsed, or gradually changed to a target value corresponding to a gear which is engaged after gear shifting.

While it has been described that automatic transmission 50 of vehicle 1 in the present embodiment is a geared transmission, the transmission may be a manual transmission instead of automatic transmission 50, or may be a continuously variable transmission for which a plurality of discrete gear ratios are set for use as a plurality of gears.

Regarding vehicle 1 in the present embodiment, it has been described that the target value is determined based on the gear. The vehicle, however, is not limited to this. For example, in the case where vehicle 1 has a continuously variable transmission as described above, the target value may be determined based on a selected gear ratio.

While vehicle 1 in the present embodiment having the configuration of the hybrid vehicle shown in FIG. 1 has been described by way of example, the vehicle is not particularly limited to this configuration but may be a series-type hybrid vehicle or parallel-type hybrid vehicle, for example. The above-described modifications may be implemented by being wholly or partially combined.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A hybrid vehicle comprising:
   an electric motor configured to transmit motive power to a wheel;
   a power storage device configured to supply and receive electric power to and from said electric motor;
   an engine used for charging said power storage device; and
   an electronic control unit configured to determine a target value based on a condition of the vehicle and control a state of charge of said power storage device so that said state of charge reaches said target value,
   said electronic control unit configured to restrict an amount of change of said target value when a magnitude of a drive force required by a driver is relatively small, with respect to said amount of change of said target value when said magnitude of the drive force required by the driver is relatively large.

2. The hybrid vehicle according to claim 1, further comprising an automatic transmission having an automatic transmission mode and a manual transmission mode, wherein
   said electronic control unit restricts said amount of change when said automatic transmission mode is being selected, with respect to said amount of change when said manual transmission mode is being selected.

3. The hybrid vehicle according to claim 1, further comprising a detection device configured to detect a depression amount of an accelerator pedal, wherein
   said electronic control unit restricts said amount of change when said depression amount is relatively small, with respect to said amount of change when said depression amount is relatively large.

4. The hybrid vehicle according to claim 1, further comprising a geared transmission, wherein
   said electronic control unit determines said target value based on a gear of said geared transmission.

5. The hybrid vehicle according to claim 4, wherein
   said geared transmission starts upshifting from a first gear to a second gear when a travel condition of the vehicle makes a transition from a region outside an upshift region into said upshift region, and starts downshifting from said second gear to said first gear when said travel condition makes a transition from a region outside a downshift region into said downshift region, and
   when said travel condition is in a region between said upshift region and said downshift region, said electronic control unit sets said target value of said state of charge to a value between a first target value of said state of charge corresponding to said first gear and a second target value of said state of charge corresponding to said second gear.

* * * * *